United States Patent
Banville

(10) Patent No.: US 9,571,377 B2
(45) Date of Patent: Feb. 14, 2017

(54) DYNAMIC DENIAL OF SERVICE PROTECTION

(71) Applicant: Oracle International Corporation, Redwood Shores, CA (US)

(72) Inventor: Stephen R. Banville, Dracut, MA (US)

(73) Assignee: Oracle International Corporation, Redwood Shores, CA (US)

( * ) Notice: Subject to any disclaimer, the term of this patent is extended or adjusted under 35 U.S.C. 154(b) by 48 days.

(21) Appl. No.: 14/567,261

(22) Filed: Dec. 11, 2014

(65) Prior Publication Data

US 2016/0173451 A1  Jun. 16, 2016

(51) Int. Cl.
*G06F 9/00* (2006.01)
*H04L 12/26* (2006.01)
*H04L 29/06* (2006.01)
*H04L 12/863* (2013.01)

(52) U.S. Cl.
CPC .......... *H04L 43/16* (2013.01); *H04L 47/6215* (2013.01); *H04L 47/6295* (2013.01); *H04L 63/0236* (2013.01); *H04L 63/1458* (2013.01); *H04L 2463/141* (2013.01)

(58) Field of Classification Search
CPC .... G06F 21/53; G06F 21/604; G06F 21/6281; G06F 21/70; H04L 9/0822; H04L 9/0825; H04L 9/0897; H04L 9/3234; H04L 9/3236; H04L 9/3247; H04L 65/1006; H04L 65/1016; H04L 65/1023; H04L 65/103; H04L 65/608

USPC .......................................................... 726/13
See application file for complete search history.

(56) References Cited

U.S. PATENT DOCUMENTS

| | | |
|---|---|---|
| 2006/0041667 A1* | 2/2006 | Ahn .................... H04L 12/5693 709/229 |
| 2006/0075480 A1* | 4/2006 | Noehring ................ H04L 47/10 726/12 |
| 2013/0247181 A1 | 9/2013 | Saraf et al. |
| 2013/0263268 A1 | 10/2013 | Kim et al. |
| 2014/0123278 A1 | 5/2014 | Thubert et al. |
| 2014/0337435 A1 | 11/2014 | Kaefer et al. |

* cited by examiner

*Primary Examiner* — Morshed Mehedi
*Assistant Examiner* — Abiy Getachew
(74) *Attorney, Agent, or Firm* — Miles & Stockbridge PC

(57) ABSTRACT

A method for providing dynamic denial-of-service (DoS) protection using a multicore processor is provided. The multicore processor includes a shared memory, a data processor core, a dynamic DoS processor core and a signaling processor core. The data path processor core receives a network packet addressed to a host computer, selects a target queue based on a traffic type of the network packet, and adds the network packet to the target queue. The target queue is selected from one of n queues, stored in the shared memory, associated with the traffic type. The dynamic DoS processor core services the target queue, including removing the network packet from the target queue and adding the network packet to the host queue. The signaling processor core services the host queue, including removing the network packet from the host queue and sending the network packet to the host computer.

19 Claims, 6 Drawing Sheets

DYNAMIC DENIAL OF SERVICE PROTECTION

TECHNICAL FIELD

One embodiment is directed generally to a computer system, and, in particular, to a computer system that provides dynamic denial-of-service (DoS) protection.

BACKGROUND

In many systems, hardware-based network traffic managers control the delivery of network packets from an external network, such as the Internet, to one or more hosts within a local network. A DoS attack against a host on a local network attempts to temporarily or permanently disrupt or suspend the services provided by the host, typically by overloading the host with external communications requests. The large volume of network packets arriving at the host reduces the responsiveness of the host or renders the host unable to respond. Other types of DoS attacks consume host resources, disrupt routing tables, communication sessions, physical network components, etc. While hardware-based traffic managers enforce bandwidth regulations to protect hosts within a local network from DoS attacks, these devices introduce undesirable latencies into the processing of network packets.

SUMMARY

Embodiments of the present invention advantageously provide a method and system for providing dynamic denial-of-service (DoS) protection using a multicore processor. The multicore processor includes a shared memory, a data processor core, a dynamic DoS processor core and a signaling processor core. The data path processor core receives a network packet addressed to a host computer, selects a target queue based on a traffic type of the network packet, and adds the network packet to the target queue. The target queue is selected from one of n queues, stored in the shared memory, associated with the traffic type. The dynamic DoS processor core services the target queue, including removing the network packet from the target queue and adding the network packet to the host queue. The signaling processor core services the host queue, including removing the network packet from the host queue and sending the network packet to the host computer.

DETAILED DESCRIPTION

Figure 1:
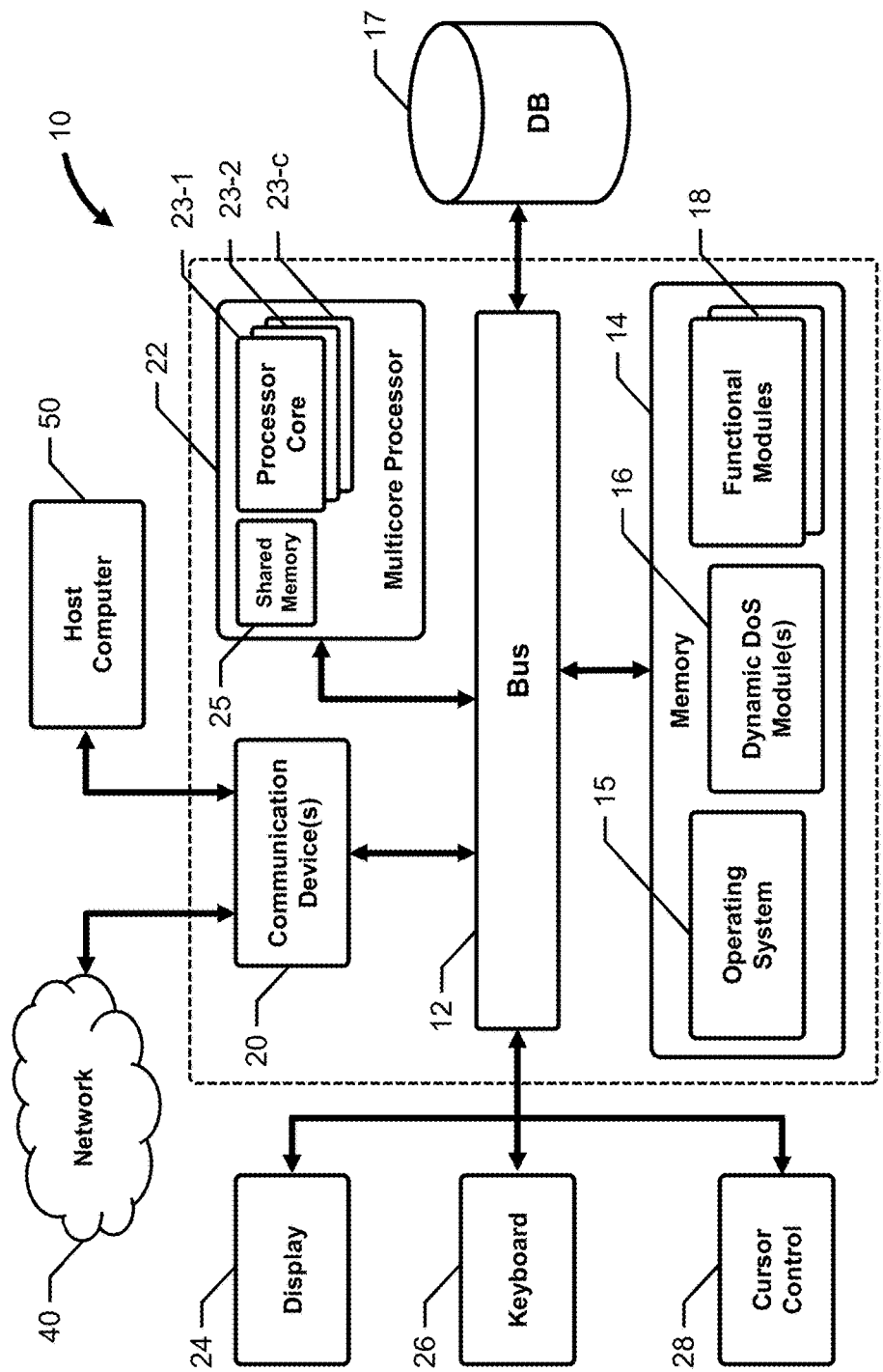
FIG. 1 is a block diagram of a computer system, in accordance with an embodiment of the present invention.

Embodiments of the present invention will now be described with reference to the drawing figures, in which like reference numerals refer to like parts throughout.

Embodiments of the present invention advantageously provide dynamic DoS protection by regulating bandwidth and quality of service to one or more hosts on a local network. Additionally, embodiments provide an improvement in DoS protection performance over hardware-based traffic managers by using a multiprocessing computer system with one or more multicore processors with internal shared memory. Generally, embodiments designate a separate core within the multicore processor, e.g., a "DoS" processor core, for the regulation of bandwidth control for control plane traffic requiring rate limiting and prioritization. Embodiments use shared memory within the multicore processor itself to allow for a distribution of traffic to be queued and processed.

A multicore processor includes two or more central processing units (CPUs), called "cores," that are integrated onto a single die, chip or package. Various CPU architectures may be implemented by the cores, such as, for example, multithreading, superscalar, very long instruction word, single instruction multiple data, etc. Performance improvements over single core processors depend, at least in part, on the degree of parallelism achieved by the CPU architecture and the degree to which the software can execute in parallel simultaneously on multiple cores.

Each core executes instructions from an instruction set architecture (ISA), such as, for example, data handling and memory operations, arithmetic and logical operations, control flow operations, etc., that have been modified to support multiprocessing. Data handling and memory instructions may include setting a register to a specific value, moving data from a register to a memory or from a memory to a register, reading and writing data from memory, hardware devices, etc. Arithmetic and logical operations may include adding, subtracting, multiplying and dividing, bitwise operations, comparisons, etc. Control flow operations may include branching, conditional branching, indirect branching, etc.

Cores may be connected to one another on the chip using a variety of network architectures, including, for example, bus, ring, two-dimensional mesh, crossbar, etc. Cores may also share memory on the chip, which provides significantly faster access times than system memory. In one embodiment, each core has an internal level 1 (L1) cache, and shares a level 2 (L2) cache, located on the chip, with the other cores. Access to the shared L2 cache on the chip is significantly faster than accessing system memory over an external memory or data bus, and shared L2 caches can significantly improve multiprocessing speed. Additional caches may also be located on the chip, such as, for example, a level 3 (L3) cache, a level 4 (L4) cache, etc. In another embodiment, each core has an internal L1 cache, each pair of cores shares an L2 cache on the chip, and all of the cores share an L3 cache on the chip.

Advantageously, at least a portion of the shared memory, such as, for example, at least a portion of the shared L2 cache, at least a portion of the shared L3 cache, etc., is configurable to be memory-mapped static random-access memory (SRAM). Shared memory, such as memory-mapped SRAM, may be used to store data, intra and inter core communication messages, etc. In other embodiments, messages may be passed directly between cores over the chip network architecture.

Data buffers may be created within the shared memory on the chip, such as within shared memory-mapped SRAM, in order to more efficiently process data. A data buffer is simply a region of shared memory, accessible by one or more cores, that is used to store data for a process executing on a core, store and exchange data between two or more processes executing on a core, store and exchange data between processes executing on different cores, etc. Generally, data is enqueued in a data buffer, temporarily stored in the data buffer and then dequeued from the data buffer. Data buffers may have a fixed size to accommodate a fixed number of buffer entries, or, conversely, data buffers may expand or shrink in size depending on processing requirements. The first or oldest entry in a buffer is typically known as the head of the queue, while the last or newest entry in a buffer is typically known as the tail of the queue. Several different types of buffers may be used to enqueue, store and dequeue data, such as, for example, a First In First Out (FIFO) buffer, a Last In First Out (LIFO) buffer, a circular or ring buffer, etc.

A FIFO buffer is a one-dimensional array of n data elements, in which each data element stores m bytes of data. The bottom element (oldest entry) of the array is the head of the queue, while the top element (newest entry) of the array is the tail of the queue. In a FIFO buffer, the head of the queue is always processed. The remaining elements are then shifted, within the array, towards the head of the queue. New elements are added to the FIFO buffer at the tail of the queue. If elements are added faster than elements are removed, the FIFO buffer will eventually become full, after which time the tail of the queue may be repeatedly overwritten with new data, or the new data may be simply discarded. Shifting every element of the array after the head of the queue is processed may be disadvantageous in many circumstances, particularly when buffer processing speed is important.

A LIFO buffer is also a one-dimensional array of n data elements, in which each data element stores m bytes of data. The bottom element (oldest entry) of the array is the head of the queue, while the top element (newest entry) of the array is the tail of the queue. In a LIFO buffer, the tail of the queue is always processed, and the remaining elements are not shifted within the array and simply remain in place. New elements are added to the LIFO buffer at the tail of the queue, just like the FIFO buffer. And, if elements are added faster than elements are removed, the LIFO buffer will eventually become full, after which time the tail of the queue may be repeatedly overwritten with new data, or the new data may be simply discarded.

A circular buffer is also a one-dimensional array of n data elements, in which each data element stores m bytes of data. A start pointer indicates the oldest entry of the array, which is the head of the queue, while an end pointer indicates the newest entry of the array, which is the tail of the queue. In a circular or ring buffer, the head of the queue is always processed, similar to a FIFO buffer. However, rather than shifting the remaining elements towards the head of the queue, the start pointer is incremented by one element to indicate the next oldest element of the array. The remaining elements are not shifted and simply remain in place, similar to a LIFO buffer. New elements are added to the circular buffer at the tail of the queue, just like the FIFO and LIFO buffers. And, if elements are added faster than elements are removed, the circular buffer will eventually become full, at which time the start and end points would indicate the same element. In order to avoid this situation, one element of the array may remain empty. When the circular buffer becomes full, the tail of the queue may be repeatedly overwritten with new data, or the new data may be simply discarded.

FIG. 1 is a block diagram of a computer server/system 10 in accordance with an embodiment of the present invention. Although shown as a single system, certain functionality of system 10 may be implemented as a distributed system. Further, certain functionality disclosed herein can be implemented on separate servers or devices that may be coupled together over a network. Further, one or more components of system 10 may not be included.

System 10 includes a bus 12 or other communication mechanism for communicating information, and at least one multicore processor 22 coupled to bus 12 for processing information. Multicore processor 22 includes multiple processor cores 23-1, 23-2 . . . 23-c, and may be any type of general or specific purpose multicore processor. The number of processor cores "c" may be 2, 4, 6, 8, 10, or more. Multicore processor 22 also includes shared memory 25 accessible by each processor core 23. In alternative embodiments, multicore processor 22 may be replaced by two or more single-core processors, combinations of single-core and multicore processors, etc.

System 10 also includes a memory 14 for storing information and instructions to be executed by multicore processor 22. Memory 14 can be comprised of any combination of storage devices, such as, for example, random access memory ("RAM"), read only memory ("ROM"), static storage devices such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by multicore processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by multicore processor 22. The modules include an operating system 15 that provides operating system functionality for system 10. The modules further include a dynamic DoS module 16 for providing dynamic denial of service protection, and all other functionality disclosed herein. System 10 can include one or more additional functional modules 18, such as, for example, Oracle Database 12c Enterprise Edition or other type of database management system. Alternatively, dynamic DoS module 16 may be included within functional module 18, or divided into two or more dynamic DoS sub-modules for execution on different processor cores 23-1, 23-2 . . . 23-c. A database 17 is coupled to bus 12 to provide, inter alia, centralized storage for dynamic DoS module 16 and functional modules 18. System 10 can be part of a larger system, and one or more host computers 50 may connect to the communication device 20 through one or more intervening networks (not shown), such as, for example, a Local Area Network (LAN), a Wide Area Network (WAN), a wireless network (WiFi), the Internet, etc. System 10 is also connected to an external or public network 40, such as, for example, the Internet.

Figure 2A:
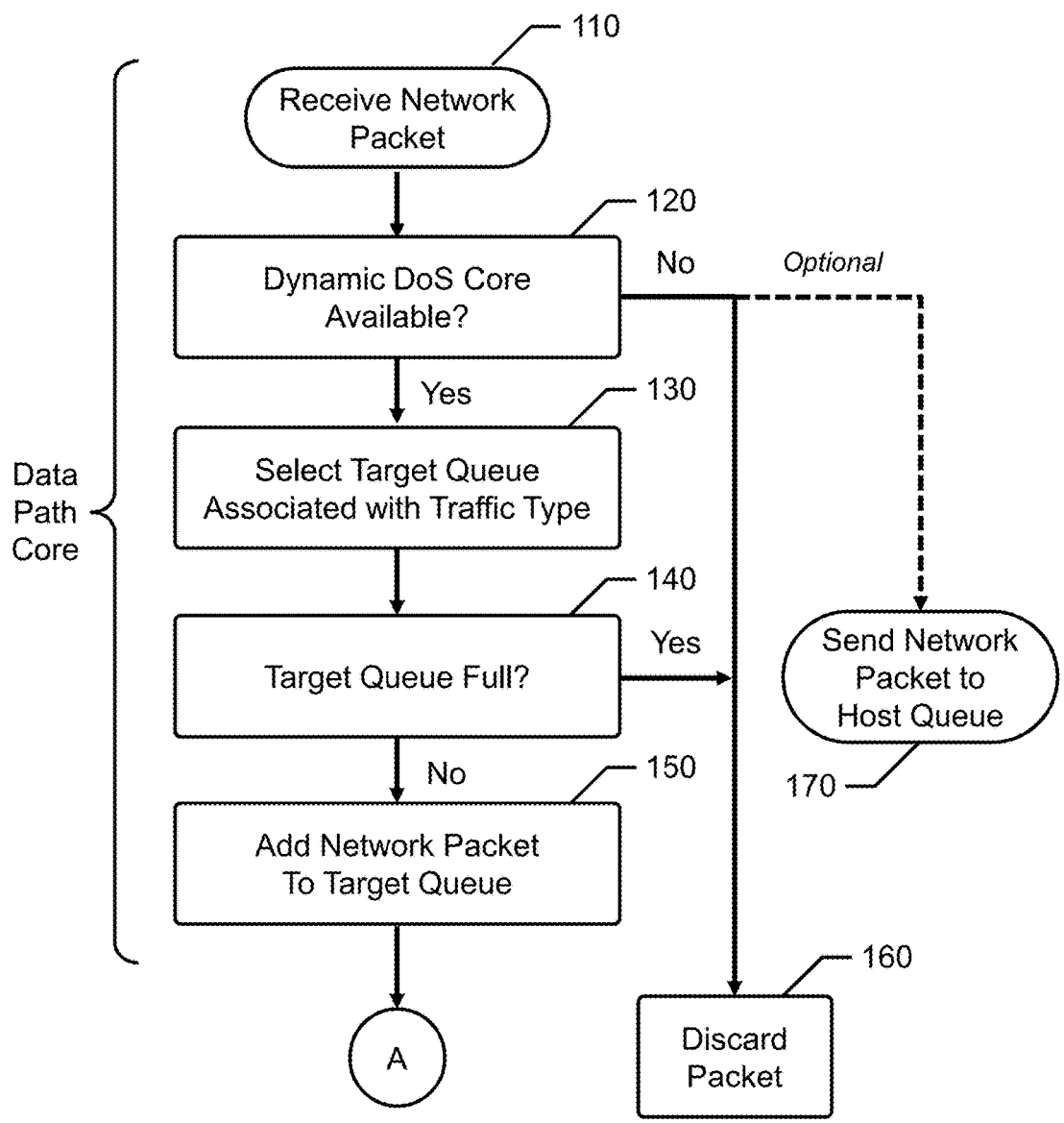
FIGS. 2A, 2B, and 2C depict a flow diagram of the functionality of a dDoS module of FIG. 1, in accordance with an embodiment of the present invention.
Figure 2B:
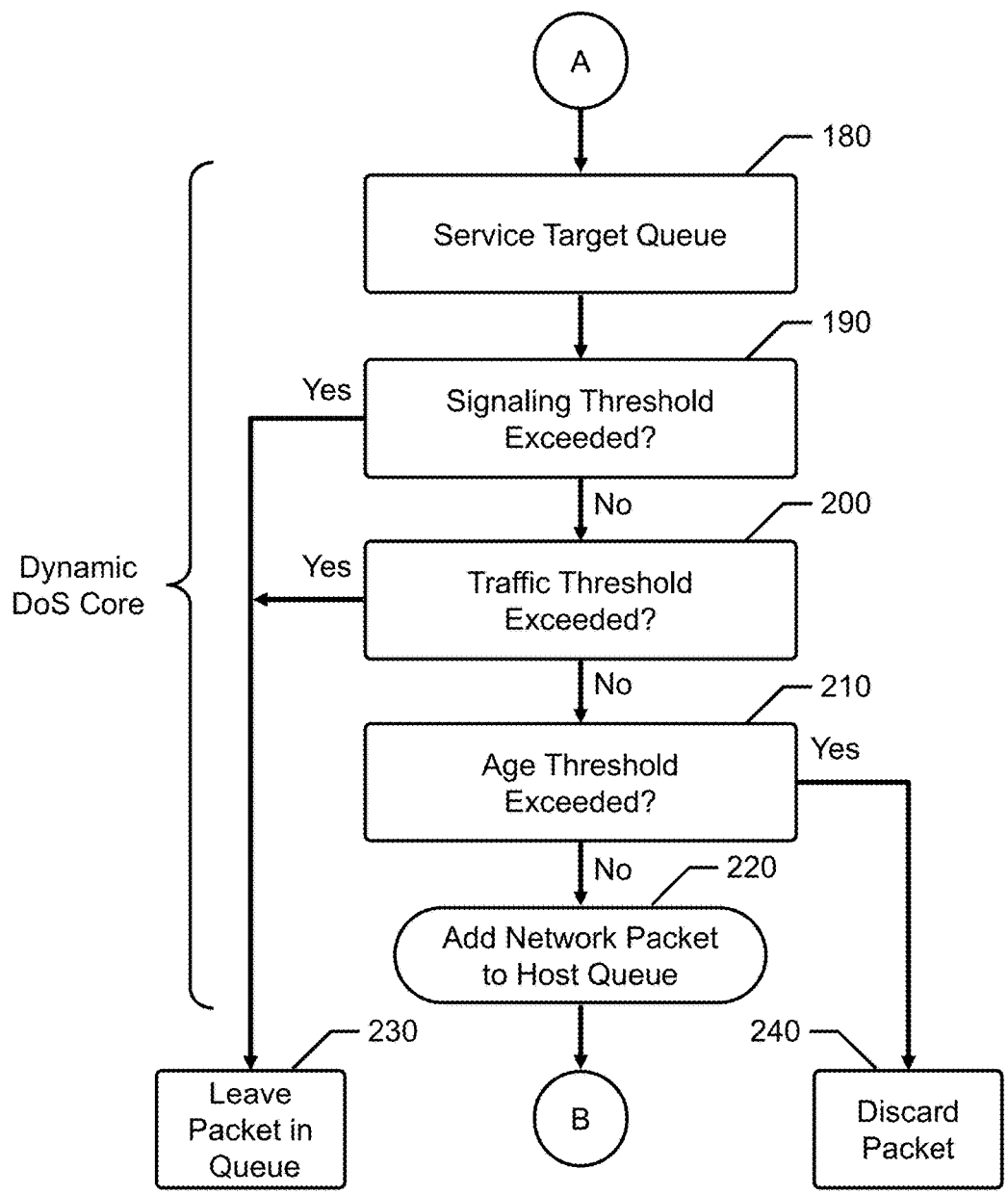
Figure 2C:
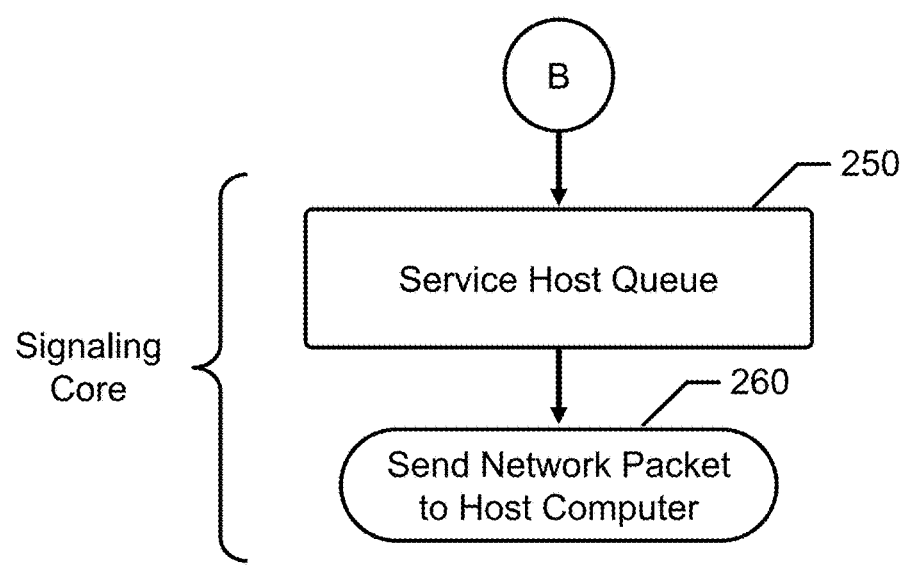

FIGS. 2A, 2B and 2C depict a flow diagram 100 of the functionality of dynamic DoS module 16 of FIG. 1, in accordance with an embodiment of the present invention. In some embodiments, the functionality of the flow diagram 100 may be implemented by software stored in memory or other computer readable, tangible non-transitory medium, and executed by one or more multicore processors. In other embodiments, the functionality may be performed by hardware, such as, for example, an application specific integrated circuit (ASIC), a programmable gate array (PGA), a field programmable gate array (FPGA), etc., or through any combination of hardware and software, that is appropriately configured to comport with the general concepts of multicore processing using shared memory.

For convenience, flow diagram 100 may be divided into three sections or procedures, a data path processor core section (procedure) depicted in FIG. 2A, a dynamic DoS processor core section (procedure) depicted in FIG. 2B, and a signaling processor core section (procedure) depicted in FIG. 2C. In one embodiment, system 10 includes one or more data path processor cores 23, a dynamic DoS processor core 23, and a signaling processor core 23. Generally, each data path processor core 23 performs the functionality outlined in FIG. 2A, the dynamic DoS processor core performs the functionality outlined in FIG. 2B, and the signaling processor core 23 performs the functionality outlined in FIG. 2C. One or more of these steps may be optional in certain embodiments.

At 110, a network packet addressed to host computer 50 is received by data path processor core 23. In one embodiment, the data path processor core 23 then determines whether the dynamic DoS processor core 23 is available to process the network packet (120). If the dynamic DoS processor core 23 is not available, then the data path processor core 23 discards the network packet (160), and returns to 110. Optionally, the data path processor core 23 may send the network packet to a host queue (170) if a traffic threshold has not been exceeded. In one embodiment, the traffic threshold represents the maximum number of network packets that are allowed to be processed in a predetermined period of time, such as, for example ARP or network packets deemed to be trusted by the host computer 50.

At 130, data path processor core 23 selects a target queue based on a traffic type of the network packet. A plurality of queues for each traffic type are stored in shared memory 25 of multicore processor 22. For example, for trusted traffic, n queues may be stored in shared memory 25, and the target queue is selected from one of n queues associated with a network packet that is trusted traffic. As discussed below, the queues may be ring buffers, and the number of queues allows for traffic spreading across the ring buffers for load balancing. In one embodiment, all of the rings may be sized to a fixed depth to allow for higher or lower probability of tail dropping by data path processor core 23. Once network packets are queued, they will remain in the ring buffer for delivery, or be aged and discarded if host computer 50 becomes too busy.

In one embodiment, the target queue is selected based on a hash value that is generated by data path processor core 23 using information from the network packet header, such as, for example, a virtual local area network identifier, a source address, a source port, etc. The hash length l (in bits) equals log 2 n, so, for example, if n=16, then l=4 bits. The hash value functions as an index key to identify which queue should be used. Advantageously, the hash value can be used to isolate traffic of a given source or destination to one of n queues within the plurality of queues. For example, the source address of the network packet header can be hashed so that all traffic from that source would hit the same queue. In an alternative embodiment, data path processor core 23 may select a target queue based on a classification algorithm that balances traffic in order to avoid traffic from certain sources that affect all of the traffic of the same type. One such algorithm would be based on a 5 tuple hash which would consist of the packets source address+source port+destination address+destination port and the Layer 2 VLAN identifier along with protocol type or Layer 3 header.

At 150, data path processor core 23 adds the network packet to the target queue. In one embodiment, data path processor core 23 first determines whether the target queue is full (140), and, if so, discards the network packet. Data path processor core 23 then returns to 110.

At 180, dynamic DoS processor core 23 services the target queue, which includes removing the network packet from the target queue. Generally, dynamic DoS processor core 23 services all of the queues associated with each traffic type in order of priority. For example, if there are two types of traffic, i.e., trusted and untrusted, dynamic DoS processor core 23 services the queues associated with trusted traffic at a higher priority than the queues associated with untrusted traffic.

In other words, network packet prioritization is accomplished by processing high priority traffic, e.g., trusted traffic, before untrusted traffic. The number of network packets processed for a given queue type is based on the priority of the traffic queue. For example, trusted queues may be deeper than untrusted queues, and the number of network packets processed for each queue based on priority (i.e., the rate) will determine how quickly network packets will be delivered to host computer 50.

Advantageously, dynamic DoS processor core 23 may dynamically adjust the processing of the traffic flows by promoting and demoting certain traffic types between trusted and untrusted categories. The overall behavior is such that traffic flows in a trusted category will receive higher priority during queue servicing, meaning that the network packets will be delivered sooner and will not be subject to discards. Untrusted traffic, on the other hand, will be subject to discards under high bandwidth conditions.

At 220, dynamic DoS processor core 23 adds the network packet to the host queue stored in shared memory 25. In one embodiment, data path processor core 23 first determines whether the signaling threshold has been exceeded (190), and, if so, leaves the network packet in the target queue. The signaling threshold represents the maximum number of network packets that are allowed to be sent to host computer 50 in a predetermined period of time, such as, for example, 1,000 packets per second. In another embodiment, data path processor core 23 also determines whether the traffic threshold has been exceeded (200), and, if so, leaves the network packet in the target queue. In a further embodiment, data path processor core 23 also determines when an age of the network packet exceeds a maximum duration, such as, for example, 50 ms, and, if so, discards the network packet.

At 250, signaling processor core 23 services the host queue, including removing the network packet from the host queue.

At 260, signaling processor core 23 sends the network packet to the host computer 50.

Figure 3:
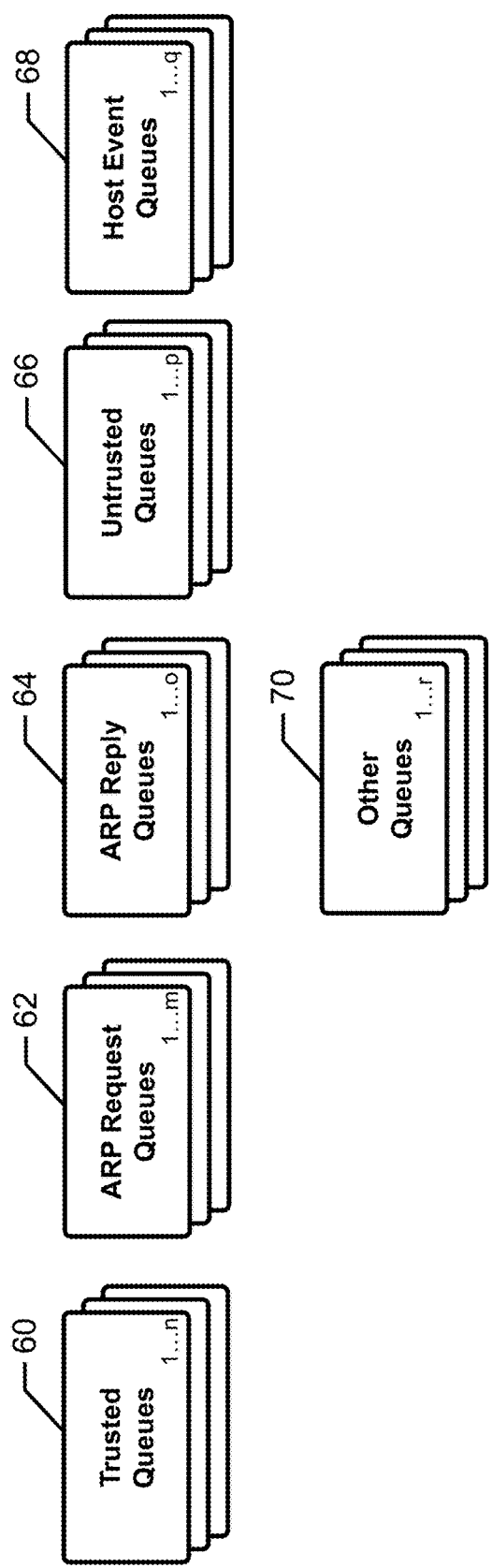
FIG. 3 depicts queues associated with traffic types, in accordance with an embodiment of the present invention.

FIG. 3 depicts queues associated with traffic types, in accordance with an embodiment of the present invention. Trusted Queues 60 include "n" queues associated with trusted traffic, ARP (Address Resolution Protocol) Request Queues 62 include "m" queues associated with ARP requests, ARP Reply Queues 64 include "o" queues associated with ARP replies, Untrusted Queues 66 include "p" queues associated with untrusted traffic, Host Event Queues 68 include "q" queues associated with host event traffic.

Other Queues 70 are also contemplated. In some embodiments, ARP Request Queues 62 and ARP Reply Queues 64 may be categorized as trusted traffic. In one embodiment, the number of queues for each traffic type is equal to 16, i.e., n=m=o=p=q=16.

In one embodiment, each queue is a ring buffer that has a certain number of elements whose size depends upon the maximum network packet size associated with that particular traffic type. For example, in one embodiment, each queue in Trusted Queues 60 has 100 ring buffer elements, and each ring buffer element represents an entire packet. These ring buffers are stored in shared memory 25 in multicore processor 22. Because this memory is accessible across all of processor cores 23, memory copy operations are not required, which advantageously improves network packet forwarding performance. In an alternative embodiment, operating system-based message queues may be used in place of shared multicore processor 22 memory-based queues. In this embodiment, memory copies reduce the network packet forwarding performance.

Figure 4:
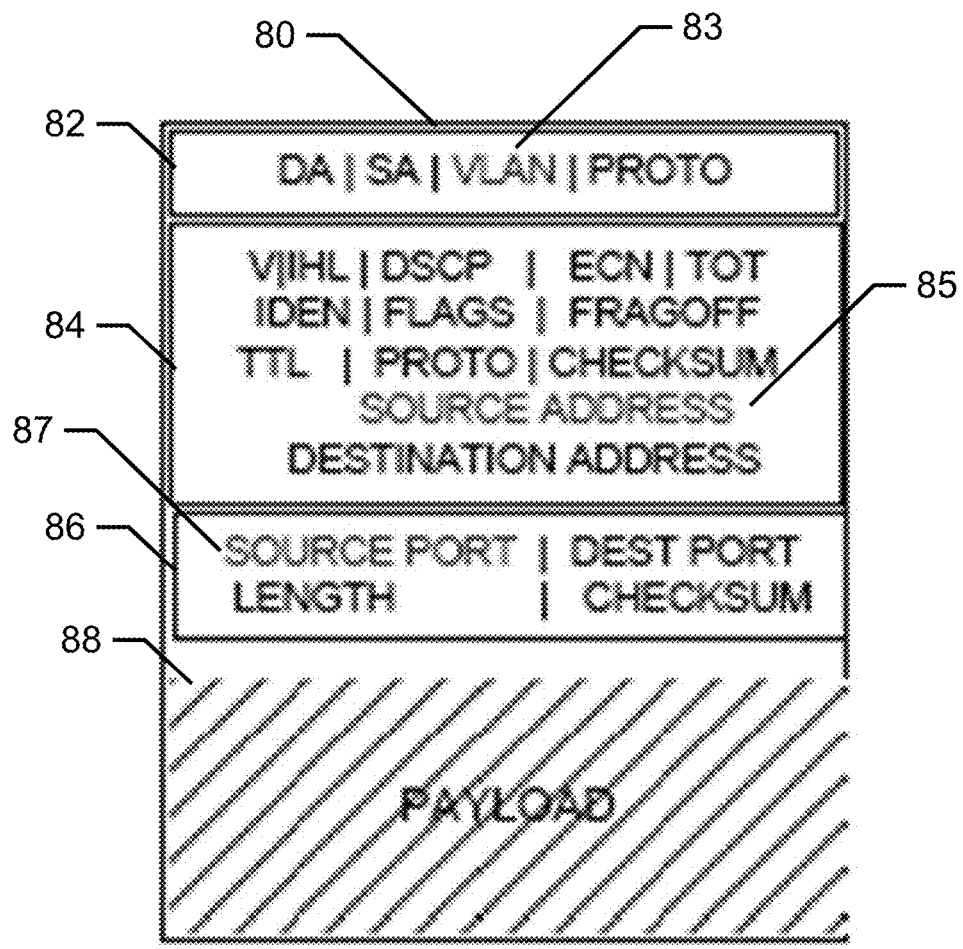
FIG. 4 depicts an exemplary network packet, in accordance with an embodiment of the present invention.

FIG. 4 depicts an exemplary network packet 80, according to an embodiment of the present invention. The network packet header has been divided for illustration purposed into three sections, i.e., header section 82, header section 84 and header section 86, while the network packet payload 88 has been generally depicted. Each header section includes several parameters, i.e., header section 82 includes DA, SA, VLAN 83 and PROTO, header section 84 includes V, IHL, DSCP, ECN, TOT, IDEN, FLAGS, FRAGOFF, TTL, PROTO, CHECKSUM, SOURCE ADDRESS 85 and DESTINATION ADDRESS, while header section 86 includes SOURCE PORT 87, DEST PORT, LENGTH and CHECKSUM. Generally, header section 84 conforms to Internet Protocol version 4 (IPv4), or its successor protocol, Internet Protocol version 6 (IPv6), although other types of protocols are also supported by the present invention.

Header section 82 represents that portion of the header of network packet 80 that supports a virtual local area network (VLAN) protocol. DA is the VLAN destination address, SA is the VLAN source address, VLAN 83 is an identifier for the virtual local area network, such as, for example, a 12-bit field, a 15-bit field, etc., and PROTO is a protocol type identifier. In one embodiment, the VLAN destination address may be the destination media access control (MAC) address, while the VLAN source address may be the source MAC address.

Header section 84 represents that portion of the header of network packet 80 that supports Internet Protocol. V (Version) is a 4-bit field that identifies the IP version number, such as "4" for IPv4, "6" for IPv6, etc. IHL (Internet Header Length) is a 4-bit field that identifies the number of 32-bit words in the header. DSCP (Differentiated Services Code Point) is a 6-bit field that is used when providing differentiated services, such as Voice over IP (VoIP). ECN (Explicit Congestion Notification) is a 2-bit field that allows end-to-end notification of network congestion without dropping packets. TOT (Total Length) is a 16-bit field that identifies the entire packet size, including header and data, in bytes. IDEN (Identification) is a 16-bit field that is primarily used for uniquely identifying the group of fragments of a single IP datagram. FLAGS is a 3-bit field that is used to control or identify fragments. FRAGOFF (Fragment Offset) is a 13-bit field that specifies the offset of a particular fragment relative to the beginning of the original unfragmented IP datagram. TTL (Time to Live) is an 8-bit field that limits a datagram's lifetime in seconds. PROTO (Protocol) is an 8-bit field that identifies the protocol used in the data portion of the IP datagram. CHECKSUM is a 16-bit field that is used for error-checking the header. SOURCE ADDRESS 85 is a 16-bit field that identifies the IPv4 address of the sender of the packet. DESTINATION ADDRESS is a 16-bit field that identifies the IPv4 address of the receiver of the packet.

Header section 86 represents that portion of network packet header 80 that supports universal datagram protocol (UDP). SOURCE PORT 87 is a 16-bit field that identifies the sender port. DEST PORT is a 16-bit field that identifies the destination port. LENGTH is a 16-bit field that specifies the length in bytes of the UDP header and UDP data. CHECKSUM is a 16-bit field that is used for error-checking of the header and the data.

Embodiments of the present invention provide dynamic DoS protection using a multicore processor. In one embodiment, the functionality is divided into three procedures, a data path processor core procedure, a dynamic DoS processor core procedure, and a signaling processor core procedure.

At the data path processor core, a network packet addressed to a host computer is received and a target queue is selected, based on a traffic type of the network packet, from one of n queues associated with the traffic type. The n queues are stored in a shared memory of the multicore processor. The network packet is then added to the target queue. At the dynamic DoS processor core, the target queue is serviced, which includes removing the network packet from the target queue, and the network packet is then added to a host queue stored in the shared memory. At the signaling processor core, the host queue is serviced, which includes removing the network packet from the host queue, and then the network packet is sent to the host computer.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A non-transitory computer readable medium having instructions stored thereon that, when executed by a multicore processor, cause the multicore processor to provide dynamic denial-of-service (DoS) protection, the protection comprising:

at a data path processor core:

receiving a network packet addressed to a host computer, selecting a target queue based on a traffic type of the network packet, the target queue being selected from one of n queues associated with the traffic type, the n queues being stored in a shared memory of the multicore processor, and adding the network packet to the target queue;

at a dynamic DoS processor core:

servicing the target queue, including removing the network packet from the target queue, and adding the network packet to a host queue stored in the shared memory; and at a signaling processor core:
   servicing the host queue, including removing the network packet from the host queue, and
   sending the network packet to the host computer,
wherein selecting the target queue includes:
   generating a hash value based on the network packet header, the hash bit length equaling $\log_2 n$; and
   selecting the target queue based on the hash value.

2. The non-transitory computer readable medium of claim 1, wherein generating the hash value is based on a virtual local area network identifier, a source address or a source port of the network packet header.

3. The non-transitory computer readable medium of claim 1, wherein the n queues are ring buffers.

4. The non-transitory computer readable medium of claim 1, wherein the dynamic DoS processor core services the queues associated with each traffic type in order of priority.

5. The non-transitory computer readable medium of claim 1, wherein the traffic type includes trusted traffic and untrusted traffic, and the dynamic DoS processor core services the queues associated with trusted traffic at a higher priority than the queues associated with untrusted traffic.

6. The non-transitory computer readable medium of claim 5, further comprising, at the dynamic DoS processor core, dynamically adjusting the processing of network packets according to traffic type.

7. The non-transitory computer readable medium of claim 1, further comprising, at the data path processor core, discarding the network packet when the dynamic DoS processor core is not available to process the network packet or when the target queue is full.

8. The non-transitory computer readable medium of claim 1, further comprising, at the dynamic DoS processor core, leaving the network packet in the target queue when a signal threshold or a traffic threshold is exceeded.

9. The non-transitory computer readable medium of claim 1, further comprising, at the dynamic DoS processor core, discarding the network packet when a network packet is exceeded.

10. A method for providing dynamic denial-of-service (DoS) protection using a multicore processor, the method comprising:
   at a data path processor core:
      receiving a network packet addressed to a host computer,
      selecting a target queue based on a traffic type of the network packet, the target queue being selected from one of n queues associated with the traffic type, wherein the n queues are ring buffers and are stored in a shared memory of the multicore processor, and
      adding the network packet to the target queue;
   at a dynamic DoS processor core:
      servicing the target queue, including removing the network packet from the target queue, and
      adding the network packet to a host queue stored in the shared memory; and
   at a signaling processor core:
      servicing the host queue, including removing the network packet from the host queue, and
      sending the network packet to the host computer,
   wherein selecting the target queue includes:
      generating a hash value based on the network packet header, the hash bit length equaling $\log_2 n$, and
      selecting the target queue based on the hash value.

11. The method of claim 10, wherein the dynamic DoS processor core services the queues associated with each traffic type in order of priority.

12. The method of claim 10, wherein the traffic type includes trusted traffic and untrusted traffic, and the dynamic DoS processor core services the queues associated with trusted traffic at a higher priority than the queues associated with untrusted traffic.

13. The method of claim 10, further comprising:
   at the data path processor core, discarding the network packet when the dynamic DoS processor core is not available to process the network packet or when the target queue is full, and
   at the dynamic DoS processor core, leaving the network packet in the target queue when a signal threshold or a traffic threshold is exceeded, and discarding the network packet when a network packet age is exceeded.

14. A system for providing dynamic denial-of-service (DoS) protection, comprising:
   a network interface; and
   a multicore processor, coupled to the network interface, including:
      a shared memory storing a plurality of traffic queues and a host queue, the traffic queues being ring buffers,
      a data path processor core,
      a dynamic DoS processor core, and
      a signaling processor core,
   wherein the data path processor core is configured to receive a network packet addressed to a host computer, select a target queue based on a traffic type of the network packet, and add the network packet to the target queue, the target queue being selected from one of n queues associated with the traffic type, the n queues being a subset of the plurality of traffic queues,
   wherein the dynamic DoS processor core is configured to service the target queue, including removing the network packet from the target queue and adding the network packet to the host queue,
   wherein the signaling processor core is configured to service the host queue, including removing the network packet from the host queue and sending the network packet to the host computer, and
   wherein selecting the target queue includes:
      generating a hash value based on the network packet header, the hash bit length equaling $\log_2 n$, and
      selecting the target queue based on the hash value.

15. The system of claim 14, wherein the dynamic DoS processor core is configured to service the queues associated with each traffic type in order of priority.

16. The system of claim 14, wherein the traffic type includes trusted traffic and untrusted traffic, and the dynamic DoS processor core services the queues associated with trusted traffic at a higher priority than the queues associated with untrusted traffic.

17. The system of claim 14, wherein:
   the data path processor core is configured to discard the network packet when the dynamic DoS processor core is not available to process the network packet or when the target queue is full, and
   the dynamic DoS processor core is configured to leave the network packet in the target queue when a signal threshold or a traffic threshold is exceeded, and discard the network packet when a network packet age is exceeded.

18. The method of claim 10, wherein generating the hash value is based on a virtual local area network identifier, a source address or a source port of the network packet header.

19. The system of claim 14, wherein generating the hash value is based on a virtual local area network identifier, a source address or a source port of the network packet header.

\* \* \* \* \*

UNITED STATES PATENT AND TRADEMARK OFFICE
CERTIFICATE OF CORRECTION

| | | |
|---|---|---|
| PATENT NO. | : 9,571,377 B2 | Page 1 of 1 |
| APPLICATION NO. | : 14/567261 | |
| DATED | : February 14, 2017 | |
| INVENTOR(S) | : Banville | |

It is certified that error appears in the above-identified patent and that said Letters Patent is hereby corrected as shown below:

In the Specification

In Column 5, Line 57, delete "log 2 n," and insert -- $\log_2 n$, --, therefor.

In the Claims

In Column 9, Line 38, in Claim 9, delete "packet is" and insert -- packet age is --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*